United States Patent
Rikleen et al.

(10) Patent No.: US 10,618,249 B2
(45) Date of Patent: *Apr. 14, 2020

(54) LAMINATES COMPRISING REINFORCED AEROGEL COMPOSITES

(71) Applicants: W. L. Gore & Associates, Inc., Newark, DE (US); ASPEN AEROGELS, INC., Northborough, MA (US)

(72) Inventors: Leslie Rikleen, Newark, DE (US); Michael Magyar, Elkton, MD (US); Eric O'Bryan, Greenville, DE (US); David Mihalcik, Northborough, MA (US); Owen Evans, Chelmsford, MA (US); Nicholas Zafiropoulos, Wayland, MA (US); George Gould, Mendon, MA (US)

(73) Assignees: W. L. Gore & Associates, Inc., Newark, DE (US); Aspen Aerogels, Inc., Northborough, MA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/417,142

(22) Filed: Jan. 26, 2017

(65) Prior Publication Data

US 2017/0210093 A1 Jul. 27, 2017

Related U.S. Application Data

(60) Provisional application No. 62/287,762, filed on Jan. 27, 2016.

(51) Int. Cl.
*B32B 5/18* (2006.01)
*B32B 5/02* (2006.01)
(Continued)

(52) U.S. Cl.
CPC .......... *B32B 5/18* (2013.01); *B32B 3/06* (2013.01); *B32B 5/02* (2013.01); *B32B 5/022* (2013.01);
(Continued)

(58) Field of Classification Search
CPC .. B32B 5/18; B32B 3/06; B32B 5/245; B32B 7/12; B32B 27/322; B32B 2266/126
See application file for complete search history.

(56) References Cited

U.S. PATENT DOCUMENTS

| 2,117,605 A | 5/1938 | Fowler et al. |
| 2,739,134 A | 3/1956 | Parry et al. |

(Continued)

FOREIGN PATENT DOCUMENTS

| CN | 104029429 A | 9/2014 |
| WO | WO-01/94436 A2 | 12/2001 |

(Continued)

OTHER PUBLICATIONS

International Search Report and Written Opinion for PCT/US2017/015188 dated Apr. 18, 2017.
(Continued)

*Primary Examiner* — Hai Vo
(74) *Attorney, Agent, or Firm* — Greenberg Traurig, LLP

(57) ABSTRACT

Described herein are aerogel composites. The aerogel composites comprise at least one base layer having a top surface and a bottom surface, the base layer comprising a reinforced aerogel composition which comprises a reinforcement material and a monolithic aerogel framework, a first facing layer comprising a first facing material attached to the top surface of the base layer, and a second facing layer comprising a second facing material attached to the bottom surface of the base layer. At least a portion of the monolithic aerogel framework of the base layer extends into at least a portion (Continued)

of both the first facing layer and the second facing layer. The first facing material and the second facing material each consist essentially of fluoropolymer material.

7 Claims, 7 Drawing Sheets

(51) Int. Cl.

| | | |
|---|---|---|
| B32B 27/32 | (2006.01) | |
| B32B 3/06 | (2006.01) | |
| B32B 5/14 | (2006.01) | |
| B32B 5/16 | (2006.01) | |
| B32B 7/08 | (2019.01) | |
| B32B 5/32 | (2006.01) | |
| B32B 5/06 | (2006.01) | |
| B32B 7/02 | (2019.01) | |
| B32B 7/10 | (2006.01) | |
| B32B 5/22 | (2006.01) | |
| B32B 27/08 | (2006.01) | |
| B32B 27/30 | (2006.01) | |
| B32B 27/40 | (2006.01) | |
| B32B 5/24 | (2006.01) | |
| B32B 7/12 | (2006.01) | |
| B32B 37/12 | (2006.01) | |
| B32B 37/14 | (2006.01) | |

(52) U.S. Cl.
CPC .............. *B32B 5/024* (2013.01); *B32B 5/026* (2013.01); *B32B 5/06* (2013.01); *B32B 5/145* (2013.01); *B32B 5/16* (2013.01); *B32B 5/22* (2013.01); *B32B 5/245* (2013.01); *B32B 5/32* (2013.01); *B32B 7/02* (2013.01); *B32B 7/08* (2013.01); *B32B 7/10* (2013.01); *B32B 7/12* (2013.01); *B32B 27/08* (2013.01); *B32B 27/304* (2013.01); *B32B 27/32* (2013.01); *B32B 27/322* (2013.01); *B32B 27/40* (2013.01); *B32B 37/12* (2013.01); *B32B 37/14* (2013.01); *B32B 2250/03* (2013.01); *B32B 2250/40* (2013.01); *B32B 2260/02* (2013.01); *B32B 2260/04* (2013.01); *B32B 2262/02* (2013.01); *B32B 2262/0207* (2013.01); *B32B 2262/0238* (2013.01); *B32B 2262/0261* (2013.01); *B32B 2262/0276* (2013.01); *B32B 2262/0292* (2013.01); *B32B 2264/0257* (2013.01); *B32B 2264/101* (2013.01); *B32B 2264/107* (2013.01); *B32B 2266/025* (2013.01); *B32B 2266/0257* (2013.01); *B32B 2266/0278* (2013.01); *B32B 2266/0285* (2013.01); *B32B 2266/04* (2013.01); *B32B 2266/045* (2013.01); *B32B 2266/06* (2013.01); *B32B 2266/126* (2016.11); *B32B 2305/022* (2013.01); *B32B 2305/08* (2013.01); *B32B 2307/302* (2013.01); *B32B 2307/304* (2013.01); *B32B 2307/51* (2013.01); *B32B 2307/726* (2013.01); *B32B 2307/732* (2013.01); *B32B 2437/00* (2013.01)

(56) References Cited

U.S. PATENT DOCUMENTS

| | | | |
|---|---|---|---|
| 2,789,095 A | 4/1957 | Philip | |
| 2,811,499 A | 10/1957 | Hervey | |
| 2,831,820 A | 5/1958 | Aase et al. | |
| 2,920,983 A | 1/1960 | Bugosh | |
| 2,926,390 A | 3/1960 | Talalay et al. | |
| 2,936,294 A | 5/1960 | Kohrn | |
| 2,993,869 A | 7/1961 | Gmitter et al. | |
| 3,025,200 A | 3/1962 | Powers | |
| 3,055,360 A | 9/1962 | Turkewitsch | |
| 3,057,750 A | 10/1962 | Simko, Jr. | |
| 3,060,137 A | 10/1962 | Gemeinhardt et al. | |
| 3,075,926 A | 1/1963 | Stewart et al. | |
| 3,082,611 A | 3/1963 | Alvis et al. | |
| 3,090,094 A | 5/1963 | Schwartzwalder et al. | |
| 3,094,433 A | 6/1963 | Bugosh et al. | |
| 3,112,524 A | 12/1963 | Legler | |
| 3,129,191 A | 4/1964 | Nickerson et al. | |
| 3,171,820 A | 3/1965 | Voiz | |
| 3,342,922 A | 9/1967 | Karpovich et al. | |
| 3,386,877 A | 6/1968 | Skochdopole et al. | |
| 3,459,274 A | 8/1969 | MacPhail, Sr. | |
| 3,504,064 A | 3/1970 | Bauer | |
| 3,506,600 A | 4/1970 | Zocco et al. | |
| 3,650,993 A | 3/1972 | Zocco et al. | |
| 3,860,537 A | 1/1975 | Graham et al. | |
| 3,953,566 A | 4/1976 | Gore | |
| 4,252,517 A | 2/1981 | Milford et al. | |
| 4,454,248 A | 6/1984 | Pollock et al. | |
| 4,532,316 A | 7/1985 | Henn | |
| 4,610,863 A | 9/1986 | Tewari et al. | |
| 4,666,948 A | 5/1987 | Woerner et al. | |
| 5,026,591 A | 6/1991 | Henn et al. | |
| 5,229,429 A | 7/1993 | Hahn et al. | |
| 5,275,796 A | 1/1994 | Tillotson et al. | |
| 5,395,805 A | 3/1995 | Droege et al. | |
| 5,420,168 A | 5/1995 | Mayer et al. | |
| 5,565,142 A | 10/1996 | Deshpande et al. | |
| 5,814,405 A | 9/1998 | Branca et al. | |
| 5,889,071 A | 3/1999 | Biesmans et al. | |
| 5,962,539 A | 10/1999 | Perrut et al. | |
| 6,147,134 A | 11/2000 | Eling | |
| 6,187,831 B1 | 2/2001 | Miller et al. | |
| 6,315,971 B1 | 11/2001 | Wallace et al. | |
| 6,316,092 B1 | 11/2001 | Frank et al. | |
| 6,544,618 B1 | 4/2003 | Smith | |
| 6,670,402 B1 | 12/2003 | Lee et al. | |
| 7,118,801 B2 | 10/2006 | Ristic-Lehmann | |
| 8,546,457 B2 | 10/2013 | Alteheld et al. | |
| 2002/0094426 A1 | 7/2002 | Stepanian et al. | |
| 2003/0003284 A1 | 1/2003 | Schwertfeger et al. | |
| 2005/0100728 A1 | 5/2005 | Ristic-Lehmann et al. | |
| 2005/0192367 A1 | 9/2005 | Ou et al. | |
| 2006/0054296 A1 | 3/2006 | Eriksson | |
| 2006/0264132 A1* | 11/2006 | Leeser | C04B 28/005 442/77 |
| 2006/0269734 A1 | 11/2006 | Krajewski | |
| 2007/0173157 A1 | 7/2007 | Trifu | |
| 2007/0213417 A1 | 9/2007 | Stork et al. | |
| 2007/0272902 A1 | 11/2007 | Evans et al. | |
| 2008/0214690 A1 | 9/2008 | Komatsu et al. | |
| 2009/0029147 A1 | 1/2009 | Tang et al. | |
| 2014/0110332 A1 | 4/2014 | Hirai et al. | |
| 2014/0287641 A1 | 9/2014 | Steiner, III | |
| 2014/0349057 A1 | 11/2014 | Blackford et al. | |
| 2015/0114696 A1 | 4/2015 | Hong et al. | |
| 2017/0210092 A1* | 7/2017 | Rikleen | B32B 5/02 |

FOREIGN PATENT DOCUMENTS

| | | |
|---|---|---|
| WO | WO-2004/018919 A2 | 3/2004 |
| WO | WO-2006/002440 A2 | 1/2006 |
| WO | WO-2012/032514 A1 | 3/2012 |

OTHER PUBLICATIONS

International Search Report and Written Opinion for PCT/US2017/015180 dated Apr. 18, 2017.

Kistler, "Coherent Expanded Aerogels," J. Phys. Chem., 1932, 36 (1), pp. 52-64.

\* cited by examiner

LAMINATES COMPRISING REINFORCED AEROGEL COMPOSITES

CROSS REFERENCE TO RELATED APPLICATIONS

This application claims priority to U.S. Provisional Application No. 62/287,762 filed on Jan. 27, 2016, which is incorporated herein by reference in its entirety.

BACKGROUND

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

SUMMARY OF THE INVENTION

In one general aspect, the present disclosure can provide an aerogel material or composition which is durable and easy to handle. In one embodiment, the aerogel composition is a reinforced aerogel composition that is flexible, resilient, and self-supporting. In one embodiment, the aerogel composition is a foam-reinforced aerogel composition that is flexible, resilient, and self-supporting. In one embodiment, the aerogel composition is a foam-reinforced aerogel composition which is laminated with at least one face sheet, wherein the resulting laminated composite is flexible, resilient, and self-supporting.

In one general aspect, the present disclosure can provide an aerogel composite comprising: at least one base layer comprising a reinforced aerogel composition, wherein the reinforced aerogel composition comprises a reinforcement material and an aerogel framework, and wherein the base layer has a top surface and a bottom surface; and at least one facing layer attached to at least one surface of the base layer. In one embodiment, at least a portion of the aerogel framework of the base layer extends into at least a portion of the aerogel framework of the facing layer. In one embodiment, the facing layer comprises an aerogel framework integrated within the facing material; and at least a portion of the aerogel framework of the base layer is continuous with at least a portion of the aerogel framework of the facing layer.

In one general aspect, the present disclosure can provide an aerogel composite comprising: at least one base layer comprising a reinforced aerogel composition, wherein the reinforced aerogel composition comprises a reinforcement material and an aerogel framework, and wherein the base layer has a top surface and a bottom surface; and at least one facing layer attached to the top surface of the base layer and at least one facing layer attached to the bottom surface of the base layer. In one embodiment, at least a portion of the aerogel framework of the base layer extends into at least a portion of both the top facing layer and the bottom facing layer. In one embodiment, both the top facing layer and the bottom facing layer comprise an aerogel framework integrated within the facing material; and at least a portion of the aerogel framework of the base layer is continuous with at least a portion of the aerogel framework of both the top facing layer and the bottom facing layer.

In one general aspect, the present disclosure can provide a method of preparing an aerogel composite, comprising: providing a base layer comprising a reinforcement material and an aerogel framework, wherein the base layer has a top surface and a bottom surface; providing a facing layer comprising a sheet of facing material; and attaching the facing layer to a surface of the base layer. In one embodiment, the method comprises providing at least two facing layers comprising sheets of facing material; attaching a facing layer to the top surface of the base layer; and attaching a facing layer to the bottom surface of the base layer.

In one general aspect, the present disclosure can provide a method of preparing an aerogel composite, comprising: providing a base layer comprising a reinforcement material, wherein the base layer has a top surface and a bottom surface; providing a facing layer comprising a sheet of facing material; attaching the facing layer to a surface of the base layer; providing a gel precursor solution comprising gel precursor materials and a solvent; contacting the precursor solution with the facing layer, and allowing at least a portion of the gel precursor solution to pass through the facing layer into the reinforcement material of the base layer; allowing the gel precursor materials in the precursor solution to transition into a gel composition, forming a reinforced gel sheet; and extracting at least a portion of the solvent from the reinforced gel sheet to obtain a reinforced aerogel composite. In one embodiment, the method comprises providing at least two facing layers comprising a sheet of facing material; attaching a facing layer to the top surface of the base layer and attaching a facing layer to the bottom surface of the base layer; providing a gel precursor solution comprising gel precursor materials and a solvent; contacting the precursor solution with the top facing layer; allowing at least a portion of the gel precursor solution to pass through the top facing layer into the reinforcement material of the base layer; and allowing at least a portion of the gel precursor solution to pass through the top facing layer and through the base layer into the bottom facing layer.

In one embodiment, the step of attaching the facing layer to a surface of the base layer produces a laminate sheet of reinforcement material; and the laminate sheet of reinforcement material is dispensed onto a moving element prior to dispensing the precursor solution onto the facing layer of the laminate sheet. In one embodiment, the step of attaching the facing layer to a surface of the base layer produces a laminate sheet of reinforcement material; and the laminate sheet of reinforcement material is rolled into a preform roll and placed in a container prior to dispensing the precursor solution onto the facing layer of the laminate sheet with the container.

In one embodiment, the reinforcement material is a foam reinforcement material. In one embodiment, the reinforcement material is an open-cell foam reinforcement material, including a reticulated open-cell foam reinforcement material. In one embodiment, the foam reinforcement material comprises polyurethane foam or melamine foam. In one embodiment, the reinforced aerogel composite has a density of 0.250 g/cc or less, 0.230 g/cc or less, 0.200 g/cc or less, 0.160 g/cc or less, 0.180 g/cc or less, between 0.140 g/cc and 0.250 g/cc, or between 0.160 g/cc and 0.250 g/cc. In one embodiment, the reinforced aerogel composite has a thermal conductivity of 26.0 mW/m-K or less; 24.0 mW/m-K or less; 22.0 mW/m-K or less; 20.0 mW/m-K or less; 19.0 mW/m-K or less; between 12.0 mW/m-K and 26.0 mW/m-K, between 14.0 mW/m-K and 26.0 mW/m-K, between 16.0 mW/m-K and 26.0 mW/m-K, or between 18.0 mW/m-K and 26.0 mW/m-K.

In one embodiment, the facing layer comprises a polymeric sheet; more specifically a polymeric sheet which comprises polyesters, polyethylenes, polyurethanes, polypropylenes, polyacrylonitriles, polyamids, aramids; and more specifically polymers such as polyethyleneterphthalate, low density polyethylene, ethylene-propylene co-polymers, poly(4-methyl-pentane), polytetrafluoroethylene, poly(1-butene), polystyrene, polyvinylacetatae, polyvinylchloride, polyvinylidenechloride, polyvinylfluoride, polyvinylacrylonitrile, polymethylmethacrylate, polyoxymethylene, polyphenylenesulfone, cellulosetriacetate, polycarbonate, polyethylene naphthalate, polycaprolactam, polyhexamethyleneadipamide, polyundecanoamide, polyimide, or combinations thereof. In one embodiment, the polymeric sheet comprises or consists essentially of an expanded polymeric material; more specifically an expanded polymeric material comprising PTFE (ePTFE), expanded polypropylene (ePP), expanded polyethylene (ePE), expanded polystyrene (ePS), or combinations thereof. In one embodiment, the polymeric sheet comprises or consists essentially of a microporous polymeric material characterized by a pore size ranging from 0.1 µm to 210 µm, 0.1 µm to 115 µm, 0.1 µm to 15 µm, or 0.1 µm to 0.6 µm.

In one embodiment, the facing layer material comprises or consists essentially of a fluoropolymeric material; more specifically a fluoropolymeric material comprising polytetrafluoroethylene (PTFE); microporous PTFE described in U.S. Pat. No. 5,814,405; expanded PTFE (ePTFE) such as Gore-Tex® (available from W.L. Gore); polyvinylfluoride (PVF); polyvinylidene fluoride (PVDF); perfluoroalkoxy (PFA); fluorinated ethylene-propylene (FEP); Polychlorotrifluoroethylene (PCTFE); Ethylene tetrafluoroethylene (ETFE); polyvinylidene fluoride (PVDF); ethylene chlorotrifluoroethylene (ECTFE); or combinations thereof.

In one embodiment, the facing layer material comprises or consists essentially of a non-fluoropolymeric material; more specifically a non-fluoropolymeric material comprising aluminized Mylar; low density polyethylene, such as Tyvek® (available from DuPont); rubber or rubber composites; elastic fibers such as spandex, nylon, lycra or elastane; or combinations thereof. In one embodiment, the facing material is a flexible facing material. In one embodiment, the facing material is made of elastic fibers comprising spandex, nylon, lycra, elastane, or combinations thereof. In one embodiment, the facing material is a fluid-permeable facing material.

In one embodiment, the facing layer is attached to the base layer by an adhesive or a non-adhesive mechanism. In one embodiment, the adhesive comprises an aerosol adhesive, a urethane-based adhesive, an acrylate adhesive, a hot melt adhesive, an epoxy, a rubber resin adhesive, or a polyurethane composite adhesive. In one embodiment, the non-adhesive mechanism comprises stitching, sealing bags, rivets, buttons, clamps, wraps, or braces.

In one general aspect, the present disclosure can provide a method of preparing an aerogel composition, comprising the steps of: providing a block of a reinforced aerogel comprising a foam reinforcement material; exposing the block of a reinforced aerogel to a skiving or lathe-peeling apparatus; allowing the skiving or lathe-peeling apparatus to remove a continuous sheet of reinforced aerogel material from the block of reinforced aerogel, thereby producing a sheet of reinforced aerogel.

In one general aspect, the present disclosure can provide a method of preparing an aerogel composition, comprising the steps of: placing within a container multiple pieces of a reinforced aerogel comprising a foam reinforcement material; providing a precursor solution comprising gel precursor materials and a solvent; dispensing the gel precursor solution into the container and allowing the gel precursor to infiltrate the pieces of foam reinforcement material within the container; allowing the gel precursor materials in the precursor solution to transition into a gel composition, forming a block of reinforced gel material; exposing the block of a reinforced gel material to a skiving or lathe-peeling apparatus; allowing the skiving or lathe-peeling apparatus to remove a continuous sheet of reinforced gel material from the block of reinforced gel material, thereby producing a sheet of reinforced gel; and extracting at least a portion of the solvent from the sheet of reinforced gel material to obtain a sheet of reinforced aerogel material.

In one general aspect, the present disclosure can provide a method of preparing an aerogel composition, comprising the steps of: placing within a container multiple pieces of a reinforced aerogel comprising a foam reinforcement material; providing a precursor solution comprising gel precursor materials and a solvent; dispensing the gel precursor solution into the container and allowing the gel precursor to infiltrate the pieces of foam reinforcement material within the container; allowing the gel precursor materials in the precursor solution to transition into a gel composition, forming a block of reinforced gel material; extracting at least a portion of the solvent from the block of reinforced gel material to obtain a block of reinforced aerogel material; exposing the block of a reinforced aerogel material to a skiving or lathe-peeling apparatus; and allowing the skiving or lathe-peeling apparatus to remove a continuous sheet of reinforced aerogel material from the block of reinforced aerogel material, thereby producing a sheet of reinforced aerogel material.

In one general aspect, the present disclosure can provide a method of preparing an aerogel composition, comprising the steps of: providing a sheet of reinforced aerogel material comprising a foam reinforcement material; heating the sheet of reinforced aerogel material to a target temperature; molding or shaping the sheet of reinforced aerogel material before, during, or after the heating step; and allowing the molded or shaped sheet of reinforced aerogel material to cool, such that the sheet of reinforced aerogel material maintains the molded shape after cooling. In one embodiment, the target temperature is between 50° C. and 200° C., between 75° C. and 200° C., between 100° C. and 175° C., between 120° C. and 160° C., or about 150° C. In one embodiment, the target temperature is a temperature above the softening point of the foam reinforcement material and below the maximum use temperature of the foam reinforcement material.

DETAILED DESCRIPTION

Figure 1:
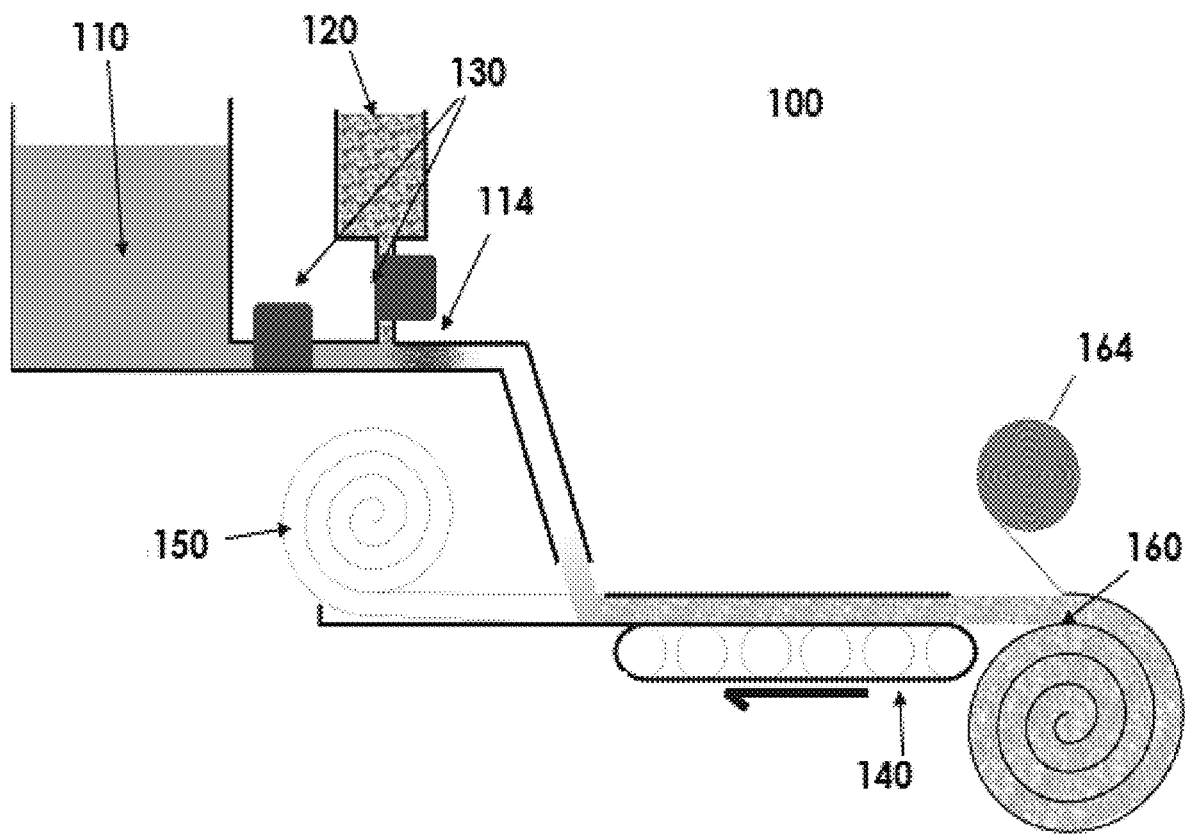
FIG. 1 depicts a method of preparing reinforced gel sheets from aerogel precursors and reinforcement sheets, using a conveyor system.

Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties.

Aerogels can also be extremely brittle and difficult to handle. The brittleness of low density aerogels can present significant complications during production and processing, which can significantly limit large scale manufacturing of these materials. The brittleness of aerogels can also make the instillation and application of aerogel materials difficult, due to dusting, cracking or structural degradation concerns. A need therefore exists for the development of aerogel compositions which are flexible, durable and easy to handle.

One solution to the brittleness of low density aerogels is to produce aerogel materials which are reinforced with a more rigid or resilient material. These reinforcing materials can include polymeric binders, adhesive glues, fibers or fibrous mats, sealed envelopes, cements, and foams. However, many reinforced composite aerogels suffer from significantly degraded thermal insulation performance when compared to the aerogel monolith alone. Reinforced composite aerogels can also have poor stability in wet or high temperature conditions, as well as insufficient flexibility for many uses. Many reinforcing materials fail to fully resolve issues related to dusting, cracking or structural degradation of aerogel materials. Furthermore, reinforcing materials can often be expensive and difficult to acquire, presenting significant complications and disadvantages during large-scale manufacturing and marketing operations for commercial products.

A need therefore exists for the development of reinforced aerogel compositions which are flexible, durable, easy to handle, and resistant to dusting, cracking and general structural degradation. A need also exists for the development of reinforced aerogel compositions which are inexpensive, which can be easily produced through large-scale manufacturing, and which can be effectively applied in a broad spectrum of insulation applications.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 20 $m^2/g$ or more.

Aerogel materials of the present disclosure thus include any aerogels or other open-celled compounds which satisfy the defining elements set forth in previous paragraphs; including compounds which can be otherwise categorized as xerogels, cryogels, ambigels, microporous materials, and the like.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

Within the context of the present disclosure, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present disclosure can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present disclosure, the term "aerogel composition" refers to any composite material which includes aerogel material as a component of the composite. Examples of aerogel compositions include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials.

Within the context of the present invention, the term "foam" refers to a material comprising a framework of interconnected polymeric structures, with a corresponding network of interconnected pores or collection of independent pores integrated within the framework, and containing gases such as air as a dispersed medium within the pores of the foam; and which has an average pore diameter above 300 nm.

Alternatively, the term "foam" can refer to a material comprising a porous solid formed by a dispersion in which a large proportion of gas by volume is dispersed in the form of gas bubbles into a liquid, solid or gel, wherein the gas bubbles are often stabilized by solid particles or by soluble substances. In general, foams can be made using a wide variety of processes—see, for example, U.S. Pat. Nos. 6,147,134; 5,889,071; 6,187,831; and 5,229,429.

The pores within the foam framework can also be referred to as "cells". Cells can be divided by cell walls or membranes, creating a collection of independent closed pores within the foam. The term "closed cell foam" refers to foam materials in which at least 50% of the pore volume is confined cells enclosed by membranes or walls. Cells in the foam can also be interconnected through cell openings, creating a network of interconnected open pores within the foam. The term "open cell foam" refers to foam materials in which at least 50% of the pore volume is open cells. The open-cell foam can comprise a reticulated open-cell foam, a non-reticulated open-cell foam, or a combination thereof. Reticulated foams are open cell foams which are produced through a reticulation process which eliminates or punctures cell membranes within the foam material. Reticulated foams typically have a higher concentration of open cells than non-reticulated foams, but tend to be more expensive and difficult to produce. Generally, no foam material has entirely one type of cell structure (open cell or close cell). Foams can be made using a wide variety of processes, including foam production processes presented in U.S. Pat. Nos. 6,147,134, 5,889,071, 6,187,831, 5,229,429, 4,454,248, and US Patent Application No 20070213417.

Within the context of the present invention, the term "rebonded foam" refers to a foam that results from a process of adhering together a collection of particles or pieces of foam material (often manufacturing scrap). Various adhesives and bonding processes may be used, and the foam used may be ground or shredded prior to rebonding. Foam may be rebonded as a way to lower cost through the use of foam that would otherwise be waste. A typical application for rebonded foam is as carpet underlay.

Within the context of the present invention, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Within the context of the present invention, the term "reinforced aerogel composition" refers to aerogel compositions which comprise a reinforcing phase within the aerogel material which is not part of the aerogel framework. The reinforcing phase can be any material which provides increased flexibility, resilience, conformability or structural stability to the aerogel material. Examples of well-known reinforcing materials include, but are not limited to: open-cell foam reinforcement materials, polymeric reinforcement materials, and fiber reinforcement materials such as discrete fibers, woven materials, non-woven materials, battings, webs, mats, and felts. Additionally, fiber based reinforcements may be combined with one or more of the other reinforcing materials, and can be oriented continuously throughout or in limited preferred parts of the composition.

Within the context of the present invention, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly (ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

Within the context of the present invention, the terms "foam-reinforced aerogel composition" or "aerogel-foam composite" refer to a reinforced aerogel composition which comprises a foam reinforcement material as a reinforcing phase. The foam reinforcement material can comprise an open cell foam, a closed cell foam, or a combination thereof. Suitable foams for use in the present invention include, but are not limited to, foams made from polymeric materials. Examples include foams made from polyolefins, polyurethanes, phenolics, melamine, cellulose acetate, and polystyrene. Polyolefin foams are preferred; more preferred are polyurethane foams. Polyether polyurethane foams are preferred for non-reticulated foams; polyester polyurethane foams are preferred for reticulated foams. Examples of polyurethane and polyepoxide foams for use in the present invention are presented in U.S. Pat. Nos. 2,117,605, 3,094,433, 2,739,134, 3,112,524, 2,789,095, 3,129,191, 2,811,499, 3,171,820, 2,831,820, 2,920,983, 3,342,922, 2,926,390, 3,386,877, 2,936,294, 3,459,274, 2,993,869, 3,504,064, 3,025,200, 3,506,600, 3,055,360, 3,650,993, 3,057,750, 3,860,537, 3,060,137, 4,252,517, 3,075,926, 3,082,611 and 3,090,094. Melamine foams are also preferred in certain embodiments. Examples of melamine foams for use in the present invention are presented in U.S. Pat. Nos. 8,546,457, 4,666,948, and WO 2001/094436. The foam reinforcement material can be a rebonded foam.

Within the context of the present disclosure, the terms "aerogel blanket" or "aerogel blanket composition" refer to aerogel compositions reinforced with a continuous sheet of reinforcement material. Aerogel blanket compositions can be differentiated from other reinforced aerogel composition which are reinforced with a non-continuous fiber or foam network, such as separated agglomerates or clumps of fiber materials. Aerogel blanket compositions are particularly useful for applications requiring flexibility, since they are highly conformable and can be used like a blanket to cover surfaces of simple or complex geometry, while also retaining the excellent thermal insulation properties of aerogels. Aerogel blanket compositions and similar fiber-reinforced aerogel compositions are described in Published US patent application 2002/0094426 (paragraphs 12-16, 25-27, 38-58, 60-88), which is hereby incorporated by reference according to the individually cited sections and paragraphs.

Within the context of the present invention, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by innovative processing and extraction to replace the mobile interstitial liquid phase in the wet gel with air to form a dry gel. Examples of wet gels include, but are not limited to: alcogels, hydrogels, ketogels, carbonogels, and any other wet gels known to those in the art.

Within the context of the present invention, the terms "additive" or "additive element" refer to materials which can be added to an aerogel composition before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published US Pat. App. 20070272902 A1 (Paragraphs [0008] and [0010]-[0039]) includes teachings of smoke suppressants and fire suppressants, and is hereby incorporated by reference according to the individually cited paragraphs.

Within the context of the present disclosure, the terms "flexible" and "flexibility" refer to the ability of an aerogel material or composition to be bent or flexed without macrostructural failure. Preferably, aerogel compositions of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, Pa.).

Aerogel materials or compositions of the present invention can be flexible, highly flexible, and/or classified flexible. Aerogel materials or compositions of the present invention can also be drapable. Within the context of the present invention, the terms "drapable" and "drapability" refer to the ability of an aerogel material or composition to be bent or flexed to 90° or more with a radius of curvature of about 4 inches or less, without macroscopic failure. An aerogel material or composition of the present invention is preferably flexible such that the composition is non-rigid and may be applied and conformed to three-dimensional surfaces or objects, or pre-formed into a variety of shapes and configurations to simplify installation or application.

Within the context of the present disclosure, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present disclosure preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions of the present disclosure which can be classified as resilient flexible according to ASTM classification standard C1101 (ASTM International, West Conshohocken, Pa.).

Within the context of the present disclosure, the term "self-supporting" refers to the ability of an aerogel material or composition to be flexible and/or resilient based primarily on the physical properties of the aerogel and any reinforcing phase in the aerogel composition. Self-supporting aerogel materials or compositions of the present disclosure can be differentiated from other aerogel materials, such as coatings, which rely on an underlying substrate to provide flexibility and/or resilience to the material.

Within the context of the present disclosure, the term "shrinkage" refers to the ratio of: 1) the difference between the measured final density of the dried aerogel material or composition and the target density calculated from solid content in the sol-gel precursor solution, relative to 2) the target density calculated from solid content in the sol-gel precursor solution. Shrinkage can be calculated by the following equation: Shrinkage=[Final Density (g/cm$^3$)−Target Density (g/cm$^3$)]/[Target Density (g/cm$^3$)]. Preferably, shrinkage of an aerogel material of the present disclosure is preferably 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present disclosure, thermal conductivity measurements are acquired according to ASTM C177 standards, at a temperature of about 37.5° C. at atmospheric pressure, and a compression of about 2 psi, unless otherwise stated. Preferably, aerogel materials or compositions of the present disclosure have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as kg/m$^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition can be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water which is absorbed or otherwise retained by an aerogel material or composition when exposed to liquid water under certain measurement conditions. The liquid water uptake of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, Pa.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom). Within the context of the present disclosure, measurements of liquid water uptake are acquired according to ASTM C1511 standards, under ambient pressure and temperature, unless otherwise stated. Preferably, aerogel materials or compositions of the present disclosure can have a liquid water uptake of according to ASTM C1511 of about 100 wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. Aerogel materials or compositions of the present disclosure can have a liquid water uptake of according to ASTM C1763 of about 100 vol wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water which is absorbed or otherwise retained by an aerogel material or composition when exposed to water vapor under certain measurement conditions. The water vapor uptake of an aerogel material or composition may be determined by methods known in the art, including, but not limited to: Standard Test Method for Determining the Water Vapor Sorption of Unfaced Mineral Fiber Insulation (ASTM C1104, ASTM International, West Conshohocken, Pa.). Within the context of the present disclosure, measurements of water vapor uptake are acquired according to ASTM C1104 standards, under ambient pressure and temperature, unless otherwise stated. Preferably, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present invention, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethylsilicates, partially hydrolyzed polyethysilicates, monomeric alkylalkoxy silanes, bis-trialkoxy alkyl or aryl silanes, polyhedral silsesquioxanes, or combinations thereof.

In one embodiment of the present invention, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl tri ethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present invention to any specific type of hydrophobic treatment procedure or aerogel substrate. The present invention can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_NMX_{4-N}$ (hydrophobizing agent)+MOH (silanol) →$MOMR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieties. Specific examples of such hydrophobizing agents include, but are not limited to: hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to: vinyltriethoxysilane and vinyltrimethoxysilane.

Organic aerogels are generally formed from carbon-based polymeric precursors. Such polymeric materials include, but are not limited to: resorcinol formaldehydes (RF), polyimide, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenzene, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, $R—Si(OX)_3$, with traditional alkoxide precursors, $Y(OX)_4$. In these formulas: X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present invention, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the invention include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present invention are preferably inorganic silica aerogels formed primarily from alcohol solutions of hydrolyzed silicate esters formed from silicon alkoxides. However, the invention as a whole may be practiced with any other aerogel compositions known to those in the art, and is not limited to any one precursor material or amalgam mixture of precursor materials.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present invention to any specific type of aerogel and/or method of preparation. The present invention can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the Si(OH)$_4$ precursors can occur as follows: 2 Si(OH)$_4$=(OH)$_3$Si—O—Si(OH)$_3$+H$_2$O. This polymerization can continue until colloidal clusters of polymerized (or oligomerized) SiO$_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, H$_2$SO$_4$, H$_3$PO$_4$, oxalic acid and acetic acid. Any base may likewise be used to catalyze precursor reactions and to obtain a higher pH solution, with a preferable base comprising NH$_4$OH.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 100° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, strong capillary forces generated by liquid evaporation can cause shrinkage and pore collapse within the gel material. Maintaining the mobile phase near or above the critical pressure and temperature during the solvent extraction process reduces the negative effects of such capillary forces. In some embodiments of the present invention, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been preheated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

Large-scale production of aerogel materials or compositions can be complicated by difficulties related to the continuous formation of gel materials on a large scale; as well as the difficulties related to liquid phase extraction from gel materials in large volumes using innovative processing and extraction techniques. Aerogel materials or compositions of the present disclosure are preferably accommodating to production on a large scale. In certain embodiments, gel materials of the present disclosure can be produced in large scale through a continuous casting and gelation process. In certain embodiments, aerogel materials or compositions of the present disclosure are produced in a large scale which requires the use of large scale extraction vessels. Large scale extraction vessels of the present disclosure can include extraction vessels which have a volume of about 0.1 $m^3$ or more, about 0.25 $m^3$ or more, about 0.5 $m^3$ or more, or about 0.75 $m^3$ or more.

Large-scale production of aerogel compositions can include a conveyor based system that combines gel precursors with a continuous reinforcement sheet, such as a fiber reinforcement sheet or open-cell foam reinforcement sheet, at one end of a conveyor to produce a continuous reinforced gel sheet. This reinforced gel sheet may be wound in a plurality of layers (preferably around a mandrel with a uniform tension) and processed in subsequent chemical treatment, aging and drying steps. Additional separator layers can be co-wound between the gel sheet layers to facilitate aging or drying of the gel material, such as providing a flow path for aging agents or drying materials. The separator layer can be impermeable (preferably impermeable to fluids at pressures below 1 psi, 5 psi or 10 psi) or permeable. Permeable layers may be in the form of perforated plastic sheets, mesh like material, perforated foil, or the like.

FIG. 1 illustrates one embodiment of a conveyor based system 100 for large-scale production of aerogel compositions. A gel precursor solution 110 is mixed with a catalyst solution 120 in a mixing section 114. The flow of the gel precursor solution 110 and catalyst solution 120 are controlled by flow controllers 130. A reinforcement material 150 is provided onto a conveyor system 140. The reinforcement material 150 can be a continuous sheet from a roll of reinforcement material. The reinforcement material 150 can also comprise segments of reinforcement material. In a preferred embodiment, the reinforcement material 150 is a fiber reinforcement material or an open-cell foam reinforcement material. The precursor solution (comprising gel precursor and catalyst) are dispensed onto conveyor belt 140 and combined with reinforcement material 150. The gel forming precursors in the gel precursor solution are transitioned into a gel material as the reinforcement material is advanced by the conveyor system 140. The resulting reinforced gel sheet is wound for subsequent chemical treatment, aging and drying steps. An additional separator layer 164 can be co-wound between the gel sheet layers 160.

Figure 2:
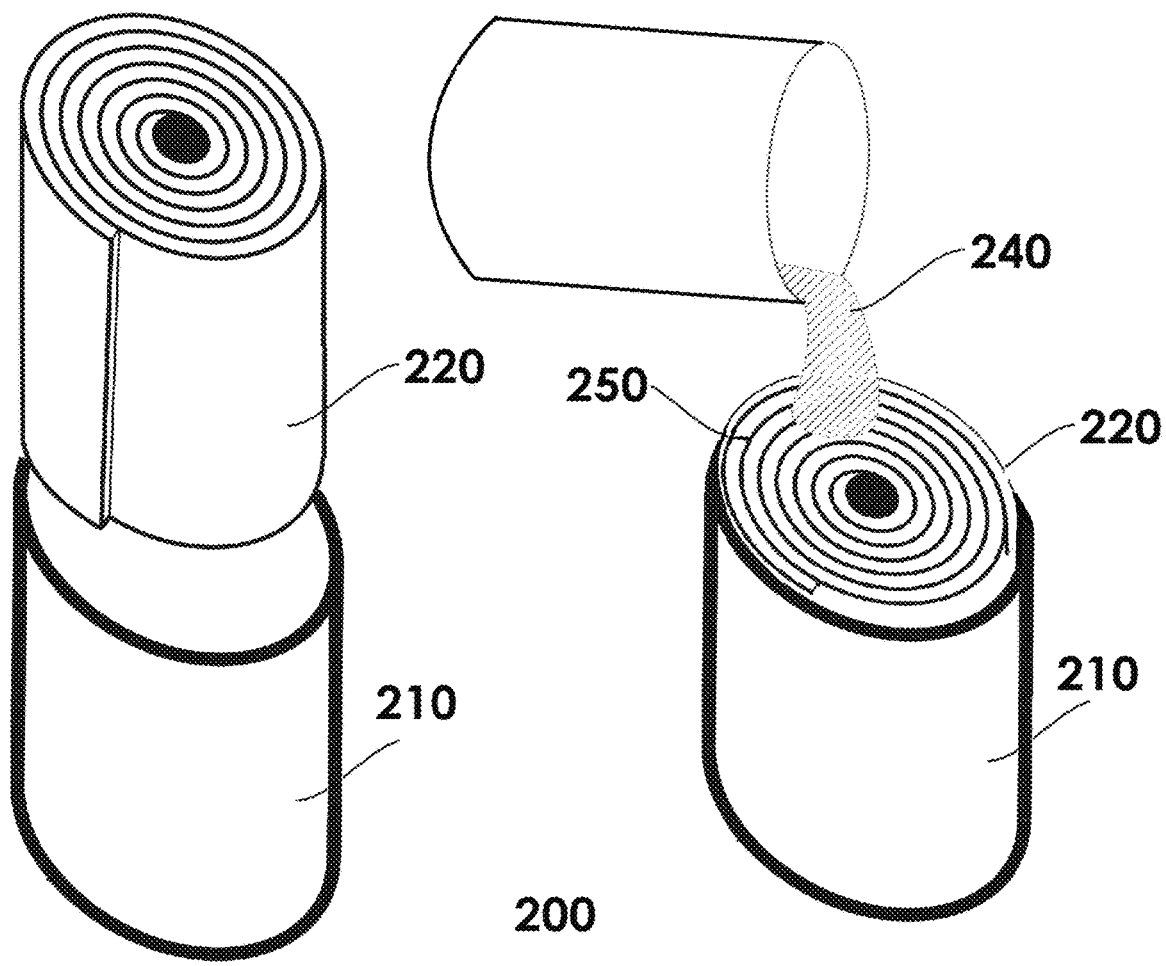
FIG. 2 depicts a method of preparing reinforced gel sheets from aerogel precursors and reinforcement sheets, using a gel-in-a-roll system.

Large-scale production of aerogel compositions can comprise a semi-continuous, batch-based process which is commonly referred as a gel-in-a-roll process. FIG. 2 illustrates one embodiment of a semi-continuous, batch-based system 200 for large-scale production of aerogel compositions. Sheets of reinforcement material are rolled into plurality of layers as a preform roll 220 and placed into a container 210. Additional separator layers 250 may be co-rolled with the reinforcement material in the preform roll 220. The separator layers may be impermeable (preferably impermeable to fluids at pressures below 1 psi, 5 psi or 10 psi) or permeable. Permeable layers may be in the form of perforated plastic sheets, or mesh like material, perforated foil, or the like. A gel precursor solution 240 is infused or combined with the reinforcement material of the preform roll 220. The gel forming precursors in the gel precursor solution are transitioned into a gel material. The resulting reinforced gel sheet can be immediately advanced for subsequent chemical treatment, aging and drying steps. The resulting reinforced gel sheet can also be unwound, and then rewound with different separator layers prior to subsequent chemical treatment, aging and drying steps.

Aerogel composites can be laminated or faced with other materials, such as reinforcing layers of facing materials. In one embodiment, the present invention comprises a multi-layer laminate comprising at least one base layer comprising a reinforced aerogel composition, and at least one facing layer. In one embodiment, the facing layer comprises a reinforcing material. In one embodiment, the reinforced aerogel composition is reinforced with a fiber reinforcement layer or an open-cell foam reinforcement layer. In one embodiment, the present invention comprises a multi-layer laminate comprising a base layer comprising a reinforced aerogel composition, and at least two facing layers comprising reinforcing materials, wherein the two facing layers are an opposite surfaces of the base layer. The a multi-layer aerogel laminate composite can be produced according to the methods and materials described in US Patent Application 20070173157, paragraphs [0004], [0010], [0011], [0017]-[0021], and [0023]-[0027]; which methods and materials are incorporated herein by reference according to the specific paragraphs cited above.

The facing layer can comprise materials which will help provide specific characteristics to the final composite structure, such as improved flexibility or reduced dusting. The facing materials can be stiff or flexible. The facing materials can comprise reflective foils. In one embodiment, the facing layer comprises a polymeric sheet; more specifically a polymeric sheet which comprises polyesters, polyethylenes, polyurethanes, polypropylenes, polyacrylonitriles, polyamids, aramids; and more specifically polymers such as polyethyleneterphthalate, low density polyethylene, ethylene-propylene co-polymers, poly(4-methyl-pentane), polytetrafluoroethylene, poly(1-butene), polystyrene, polyvinylacetatae, polyvinylchloride, polyvinylidenechloride, polyvinylfluoride, polyvinylacrylonitrile, plymethylmethacrylate, polyoxymethylene, polyphenylenesulfone, cellulosetriacetate, polycarbonate, polyethylene naphthalate, polycaprolactam, polyhexamethyleneadipamide, polyundecanoamide, polyimide, or combinations thereof. In one embodiment, the polymeric sheet comprises or consists essentially of an expanded polymeric material; more specifically an expanded polymeric material comprising PTFE (ePTFE), expanded polypropylene (ePP), expanded polyethylene (ePE), expanded polystyrene (ePS), or combinations thereof. In one preferred embodiment, the facing material consists essentially of an expanded polymeric material. In one embodiment, the polymeric sheet comprises or consists essentially of a microporous polymeric material characterized by a pore size ranging from 0.1 µm to 210 µm, 0.1 µm to 115 µm, 0.1 µm to 15 µm, or 0.1 µm to 0.6 µm.

In one embodiment, the facing layer material comprises or consists essentially of a fluoropolymeric material. Within the context of the present disclosure, the terms "fluoropolymeric" or "fluoropolymer material" refer to materials comprised primarily of polymeric fluorocarbons. Suitable fluoropolymeric facing layer materials include, but are not limited to: polytetrafluoroethylene (PTFE), including microporous PTFE described in U.S. Pat. No. 5,814,405, and expanded PTFE (ePTFE) such as Gore-Tex® (available from W.L. Gore); polyvinylfluoride (PVF); polyvinylidene fluoride (PVDF); perfluoroalkoxy (PFA); fluorinated ethylene-propylene (FEP); Polychlorotrifluoroethylene (PCTFE); Ethylene tetrafluoroethylene (ETFE); polyvinylidene fluoride (PVDF); ethylene chlorotrifluoroethylene (ECTFE); and combinations thereof. In one preferred embodiment, the facing material consists essentially of a fluoropolymeric material. In one preferred embodiment, the facing material consists essentially of an expanded PTFE (ePTFE) material.

In one embodiment, the facing layer material comprises or consists essentially of a non-fluoropolymeric material. Within the context of the present disclosure, the terms "non-fluoropolymeric" or "non-fluoropolymer material" refer to materials which do not comprise a fluoropolymeric material. Suitable non-fluoropolymeric facing layer materials include, but are not limited to: aluminized Mylar; low density polyethylene, such as Tyvek® (available from DuPont); rubber or rubber composites; elastic fibers such as spandex, nylon, lycra or elastane; and combinations thereof. In one embodiment, the facing material is a flexible facing material.

The facing layer can be attached to the base layer by using adhesives which are suitable for securing inorganic or organic facing materials to the reinforcing material of the base layer. Examples of adhesives which can be used in the present invention include, but are not limited to: cement based adhesives, sodium silicates, latexes, pressure sensitive adhesives, silicone, polystyrene, aerosol adhesives, urethane, acrylate adhesives, hot melt boding systems, boding systems commercially available from 3M, epoxy, rubber resin adhesives, polyurethane adhesive mixtures such as those described in U.S. Pat. No. 4,532,316.

The facing layer can also be attached to the base layer by using non-adhesive materials or techniques which are suitable for securing inorganic or organic facing materials to the reinforcing material of the base layer. Examples of non-adhesive materials or techniques which can be used in the present invention include, but are not limited to: heat sealing, ultrasonic stitching, RF sealing, stitches or threading, sealing bags, rivets or buttons, clamps, wraps, or other non-adhesive lamination materials.

The facing layer can be attached to the base layer at any stage of production of the aerogel composite material. In one embodiment, the facing layer is attached to the base layer after infusion of the sol gel solution into the base reinforcement material but prior to gelation. In another embodiment, the facing layer is attached to the base layer after infusion of the sol gel solution into the base reinforcement material and after subsequent gelation, but prior to aging or drying the gel material. In yet another embodiment, the facing layer is attached to the base layer after aging and drying the gel material. In a preferred embodiment, the facing layer is attached to the reinforcement material of the base layer prior to infusion of the sol gel solution into the base reinforcement material.

The facing layer can be solid and fluid impermeable. The facing layer can be porous and fluid permeable. In a preferred embodiment, the facing layer is porous and fluid permeable, and contains pores or holes with diameters large enough to allow fluids to diffuse through the facing material. In another preferred embodiment, the facing layer is attached to the reinforcement material of the base layer prior to infusion of the sol gel solution into the base reinforcement material, wherein the facing layer is porous and fluid permeable, and contains pores or holes with diameters large enough to allow fluids to diffuse through the facing material. In yet another preferred embodiment, the facing layer is attached to an open-cell foam reinforcement material prior to infusion of the sol gel solution into the foam reinforcement material, wherein the facing layer is porous and fluid permeable, and contains pores or holes with diameters large enough to allow fluids to diffuse through the facing material.

Production of multi-layer gel or aerogel compositions can include the following steps: a) attaching a fluid-permeable facing layer to a sheet of reinforcement material to produce a laminated reinforcement sheet, wherein the facing layer contains pores or holes with diameters large enough to allow fluids to diffuse through the facing material; b) infusing a gel precursor solution through the facing layer into the reinforcement sheet; and c) transitioning the gel precursor material into a gel material comprising a gel framework. A portion of the gel precursor solution is likely to be retained within the pores or holes of the facing layer, such that the gel framework in the reinforcement material of the base layer will extend into at least a portion of the facing layer. The resulting product is a multi-layer gel composition comprising: a) at least one base layer comprising a reinforcement material, and an gel framework integrated within the reinforcement material; and b) at least one facing layer comprising a fluid-permeable facing material, and an gel framework integrated within the fluid-permeable facing material; wherein at least a portion of the gel framework of the base layer extends into and is continuous with at least a portion of the gel framework of the facing layer.

Large-scale production of multi-layer aerogel compositions can include a conveyor based system, wherein the production comprises the following steps: a) attaching at least one fluid-permeable facing layer to a sheet of reinforcement material to produce a laminated reinforcement sheet, wherein the facing layer contains pores or holes with diameters large enough to allow fluids to diffuse through; and b) combining a gel precursor solution with the laminated reinforcement sheet at one end of a conveyor to produce a continuous reinforced gel sheet laminate; wherein at least a portion of the gel precursor solution infuses through the facing layer into the reinforcement sheet; and wherein the gel precursor solution is combined with the laminated reinforcement sheet at a rate which allows the gel precursor solution to pass through the facing layer and infiltrate the reinforcement sheet. In a preferred embodiment, the reinforcement material comprises an open-cell foam reinforcement material.

The reinforced, laminated gel sheet may be wound into a plurality of layers (preferably around a mandrel with a uniform tension) and processed in subsequent chemical treatment, aging and drying steps. An additional separator layers can be co-wound between the gel sheet layers to facilitate aging or drying of the gel material, such as providing a flow path for aging agents or drying materials. In a preferred embodiment, the facing layer provides a flow path for aging agents or drying materials, such that an additional separator layer is not required for aging and drying of the gel material.

Large-scale production of multi-layer aerogel compositions can include a semi-continuous, batch-based process which is commonly referred as a gel-in-a-roll process, wherein the production comprises the following steps: a) attaching a fluid-permeable facing layer to a sheet of reinforcement material, wherein the facing layer contains pores or holes with diameters large enough to allow fluids to diffuse through; b) rolling the laminated reinforcement materials into plurality of layers as a preform roll; and c) combining a gel precursor solution with the preform role. Additional separator layers may be co-rolled with the reinforcement material in the preform roll to provide a flow path for the gel precursor solution, aging agents, and drying materials. In a preferred embodiment, the facing layer provides a flow path for the gel precursor solution, aging agents, and drying materials, such that an additional separator layer is not required. In a preferred embodiment, the reinforcement material comprises an open-cell foam reinforcement material.

Reinforced aerogel composites of the present invention may be shaped into a range of three dimensional forms, including paneling, pipe preforms, half-shell preforms, elbows, joints, and other shapes regularly required in the application of insulation materials to industrial and commercial applications. In one embodiment, the reinforcement material is formed into a desired shape prior to being infused with gel precursor material. The gel material is processed in a manner which allows the preform to maintain its shape, thus resulting in a reinforced aerogel preform of a desired shape. This technique of forming shaped aerogel preforms can be challenging and inefficient because of the difficulties required to process gel materials of various shapes and configurations.

In one embodiment, the reinforced gel composite is initially in a sheet form, and is processed into a desired three dimensional shape after gelation of the gel material, or after gelation of the gel material and subsequent drying. In a preferred embodiment, a sheet of reinforced aerogel material is heated to a desired temperature, formed into a desired shape, and then allowed to cool. This technique of shaping a reinforced aerogel material is particularly effective with foam reinforcement materials. In a preferred embodiment, a sheet of reinforced aerogel material comprising a foam reinforcement material is heated to a desired temperature, formed into a desired shape, and then allowed to cool. The desired temperature for heating the aerogel material should be a temperature above the softening point of the foam reinforcement material, and below the maximum use temperature of the reinforcement material and below the self-heating temperature of the aerogel material. The desired temperature should be high enough that the reinforcement material is soft and flexible enough to be formed into a desire shape, but still stable enough to support the aerogel material during the shaping process. The desired temperature for heating the aerogel material will thus vary depending on the type of reinforcement material and aerogel material being used. In one embodiment, the desired temperature is between 50° C. and 200° C., between 75° C. and 200° C., between 100° C. and 175° C., between 120° C. and 160° C., or about 150° C.

In one embodiment, the reinforced gel composite is initially in a block or molded form, and is processed into a desired three dimensional shape after gelation of the gel material, or after gelation of the gel material and subsequent drying. In one embodiment, a block of reinforced aerogel material is formed by combining the reinforcement material and the gel precursor in a mold of a certain shape. The material in the mold is allowed to gel, and then dried to produce a shaped aerogel composite. In a preferred embodiment, a block of reinforced aerogel material is produced, and then cut or lathed into a desired shape. In another preferred embodiment, a block of reinforced aerogel material is produced, and then cut into individual sheet using a skiving machine or apparatus.

Aerogel composition can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [$13_4$C], Diatomite, Manganese ferrite, MnO, NiO, SnO, $Ag_2O$, $Bi_2O_3$, carbon black, titanium oxide, iron titanium oxide, zirconium silicate, zirconium oxide, iron (I) oxide, iron (III) oxide, manganese dioxide, iron titanium oxide (ilmenite), chromium oxide, carbides (such as SiC, TiC or WC), or mixtures thereof.

Examples of opacifying compound precursors include, but are not limited to: $TiOSO_4$ or $TiOCl_2$.

The embodiments of the present invention can be practiced using any of the processing, extraction and treatment techniques discussed herein, as well as other processing, extraction and treatment techniques known to those in the art for producing aerogels, aerogel-like materials, and aerogel compositions as defined herein.

The aerogel materials and compositions of the present invention have been shown to be highly effective as insulation materials. However, application of the methods and materials of the present invention are not intended to be limited to applications related to insulation. The methods and materials of the present invention can be applied to any system or application which would benefit from the unique combination of properties or procedures provided by the materials and methods of the present invention. The applications include, but are not limited to, thermal barriers and panels (including fire barriers and panels), insulation (including in apparel, buildings, piping, or industrial equipment), acoustical barriers, electronics, shock impact isolators, and chemical catalysis. Applications utilizing the composites of the invention may use single or multiple layers of the composites, and may mechanically alter composites of the invention such as through cutting them to size.

The following examples provide various non-limiting embodiments and properties of the present invention.

Example 1

A sheet of polyurethane (PU) open-cell foam was provided, with a density of 0.022 g/cc. A silica precursor solution was formed by combining methyltriethoxysilane (MTES), tetraethoxyorthosilicate (TEOS), water, acid catalyst, and ethanol. A gelation catalyst solution was formed by combining ethanol with dilute $NH_3$ in $H_2O$. The catalyst solution was combined with the silica precursor solution to form a catalyzed silica precursor solution. The catalyzed silica solution was poured into the polyurethane foam sheet. The composite material was allowed to gel, and then was aged in a hexamethyldisilazane (HMDS) ethanolic solution. The solvent in the aged material was extracted under supercritical conditions to generate a foam-reinforced aerogel composite. The resulting aerogel-open cell polyurethane foam composites was flexible.

Example 2

A sheet of polyurethane (PU) open-cell foam is rolled into a preform roll and placed in a cylindrical walled container. A sheet of melamine-formaldehyde open-cell foam is rolled into a separate preform roll and placed in a separate cylindrical walled container. A silica precursor solution was formed by combining methyltriethoxysilane (MTES), tetraethoxyorthosilicate (TEOS), water, acid catalyst, and ethanol. A gelation catalyst solution was formed by combining ethanol with dilute $NH_3$ in $H_2O$. The catalyst solution was combined with the silica precursor solution to form a catalyzed silica precursor solution. The resulting solution was then poured over the open cell foam rolls previously placed in the separate containers. The materials were allowed to gel. After gelation, the resulting gel-foam composites were aged overnight in a sealed bath of ethanol at 50° C. The solvent in the gels were removed by supercritical $CO_2$ extraction to generate sheets of foam-reinforced aerogel composite. The resulting aerogel-open cell polyurethane foam composite was flexible. The resulting aerogel-open cell melamine foam composite was flexible.

Example 3

A sheet of melamine-formaldehyde foam was provided. A silica precursor solution was formed by combining methyltriethoxysilane (MTES), tetraethoxyorthosilicate (TEOS), water, acid catalyst, and ethanol. A gelation catalyst solution was formed by combining ethanol with dilute $NH_3$ in $H_2O$. The catalyst solution was combined with the silica precursor solution to form a catalyzed silica precursor solution. The composite material was allowed to gel, and then was aged in a hexamethyldisilazane (HMDS) ethanolic. The solvent in the aged material was extracted under supercritical conditions to generate a melamine-foam-reinforced aerogel composite. The resulting aerogel-melamine foam composites was flexible.

Example 4

Figure 3:
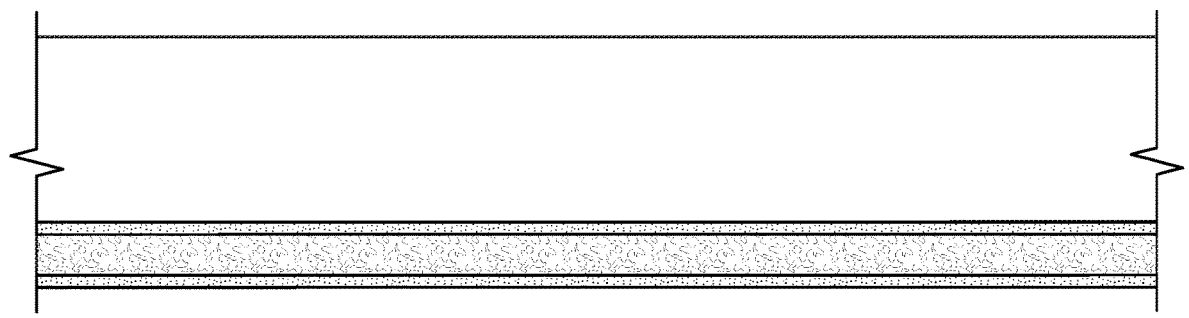
FIG. 3 depicts a flat laminate sheet comprising a base layer comprising a foam-reinforced aerogel composite with flexible facing layers on each surface of the base layer.
Figure 4:
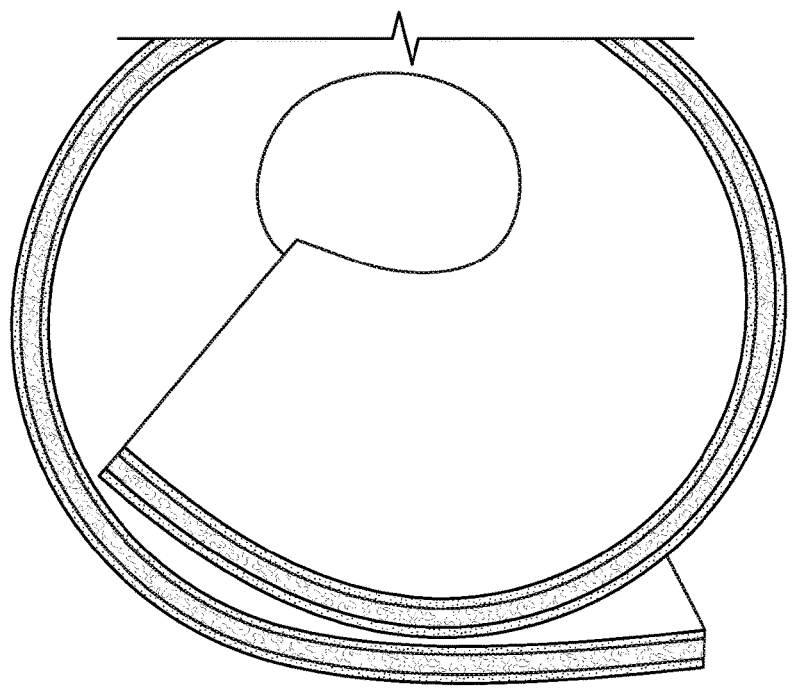
FIG. 4 depicts a rolled laminate sheet comprising a base layer comprising a foam-reinforced aerogel composite with flexible facing layers on each surface of the base layer.

Sheets of foam-reinforced aerogel composites from Example 1 and Example 3 were provided. Multiple sheets of flexible facing material were provided, each comprising about 18% spandex and 82% nylon, with a density of 0.3 g/cc. A first surface of each of the foam-reinforced aerogel composite sheets was coated with an acrylic water based adhesive (3M Fastbond Pressure Sensitive Adhesive, 4224-NF clear or blue). The adhesive was allowed to partially dry until tacky. A sheet of the flexible facing material was applied to each adhesive-coated surface of the foam-reinforced aerogel composites. Pressure was applied to the laminate as the adhesive completed drying, thus forming a solid bond between the foam-reinforced aerogel composites and the flexible facing layers. The lamination process was then repeated for the second surface of each foam-reinforced aerogel composite, thus forming a sandwich laminate sheet comprising a base layer comprising a foam-reinforced aerogel composite with flexible facing layers on each surface of the base layer. FIG. 3 and FIG. 4 depict a sandwich laminate material produced in Example 4.

Example 5

Figure 5:
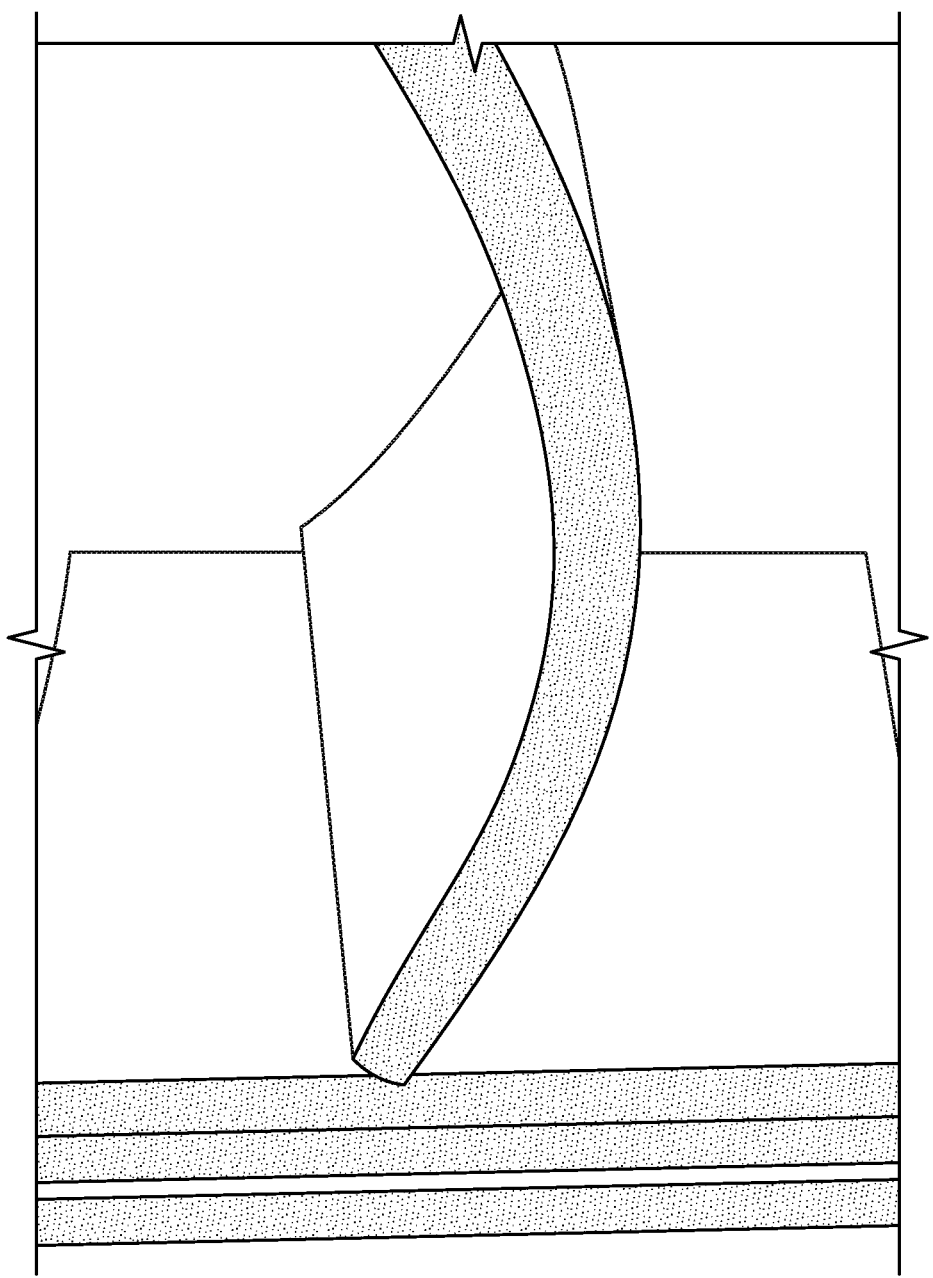
FIG. 5 depicts a laminate sheet comprising a base layer comprising a foam-reinforced aerogel composite with flexible, impermeable facing layers on each surface of the base layer.

Sheets of foam-reinforced aerogel composite from Example 1 was provided. Sheets of flexible facing material were provided, each comprising a fluid-impermeable polyurethane. A first surface of the foam-reinforced aerogel composite sheet was coated with a thermo-bonding polyethylene based adhesive. A sheet of the flexible facing material was applied to the coated surface of the foam-reinforced aerogel composite sheet. Pressure and heat was applied to the laminate as the adhesive completed bonding, thus forming a solid bond between the foam-reinforced aerogel composite and the flexible facing layer. The lamination process was then repeated for the second surface of the foam-reinforced aerogel composite, thus forming a sandwich laminate sheet comprising a base layer comprising a foam-reinforced aerogel composite with flexible facing layers on each surface of the base layer. FIG. 5 depicts a sandwich laminate material produced in Example 5.

Example 6

Figure 6:
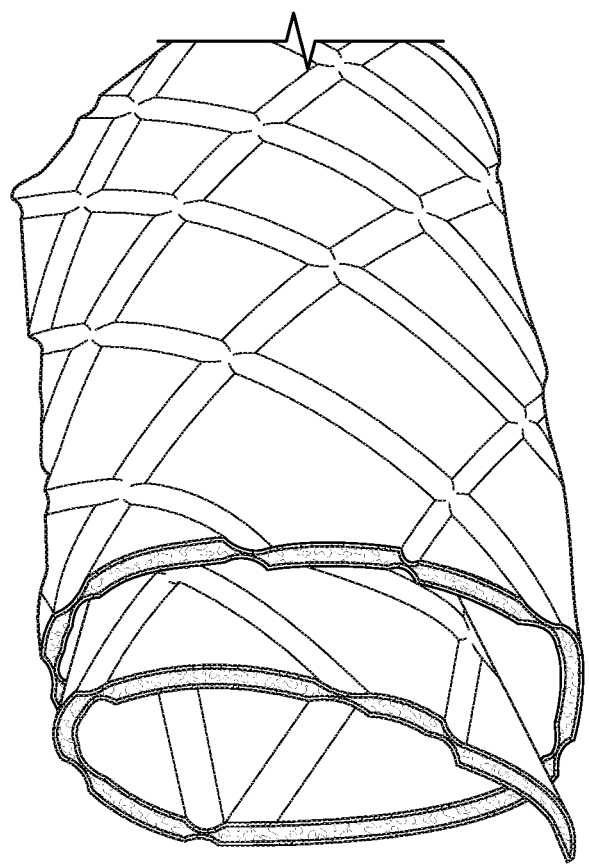
FIG. 6 depicts a rolled laminate sheet comprising layers which are bonded using ultrasonic sewing.
Figure 7:
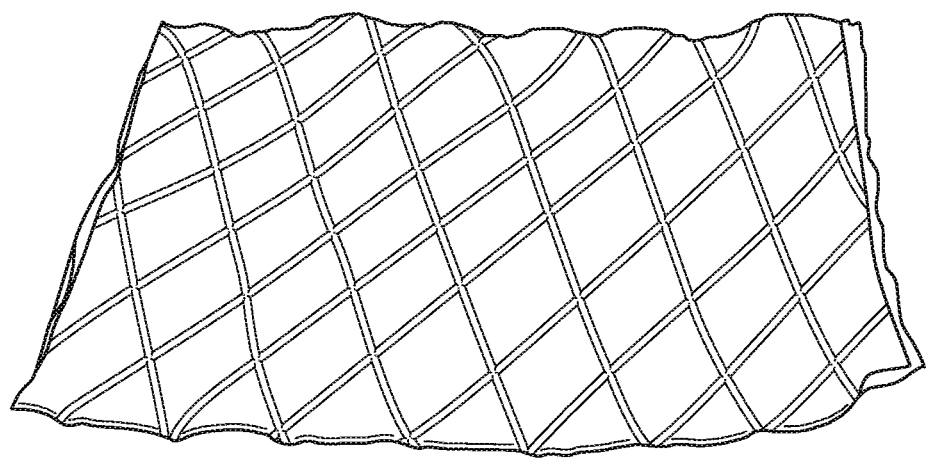
FIG. 7 depicts a flat laminate sheet comprising layers which are bonded using ultrasonic sewing.

Sheets of foam-reinforced aerogel composite from Example 3 was provided. Sheets of flexible facing material were provided, each comprising about 18% spandex and 82% nylon, with a density of 0.3 g/cc. A sheet of flexible facing spandex material was placed on each side of the sheet of foam-reinforced aerogel composite. An Ultrasonic Sewing Machine was used to bond the laminate through patterned application of high-energy ultrasonic energy through the layers of the laminate. The Ultrasonic Sewing process formed a sandwich laminate sheet comprising a base layer comprising a foam-reinforced aerogel composite with flexible facing layers attached to each surface of the base layer, and with no adhesive material between the base layer and the facing layer. FIG. 6 and FIG. 7 depict a sandwich laminate material produced in Example 6.

Example 7

Samples from Examples 4, 5 and 6 were provided. Each sample was tested for density and thermal conductivity (TC) both before and after the lamination process. TC was measured at 37.5° C. in atmospheric pressure, and under a 2 psi load. The following Table 1 provides measurement results:

TABLE 1

| Sample | Example | Description | Thickness (mm) | Density (g/cc) | TC (mW/m-K) |
|---|---|---|---|---|---|
| 1a | 1 | Polyurethane foam; unlaminated | 2.32 | 0.164 | 15.0 |
| 1b | 1, 4 | Polyurethane foam; laminated w/ spandex | 3.62 | 0.230 | 22.4 |
| 2a | 3 | Melamine foam; unlaminated | 2.51 | 0.122 | 12.6 |
| 2b | 3, 4 | Melamine foam; laminated w/ spandex | 3.82 | 0.198 | 18.7 |
| 3a | 1 | Polyurethane foam; unlaminated | 12.3 | 0.163 | 17.6 |
| 3b | 1, 5 | Polyurethane foam; laminated w/ polyurethane | 12.9 | 0.187 | 18.4 |
| 4a | 3 | Melamine foam; unlaminated | — | 0.122 | 15.0 |
| 4b | 3, 6 | Melamine foam; laminated w/ spandex; ultrasonic sewing | — | 0.170 | 25.2 |

Example 8

Figure 8:
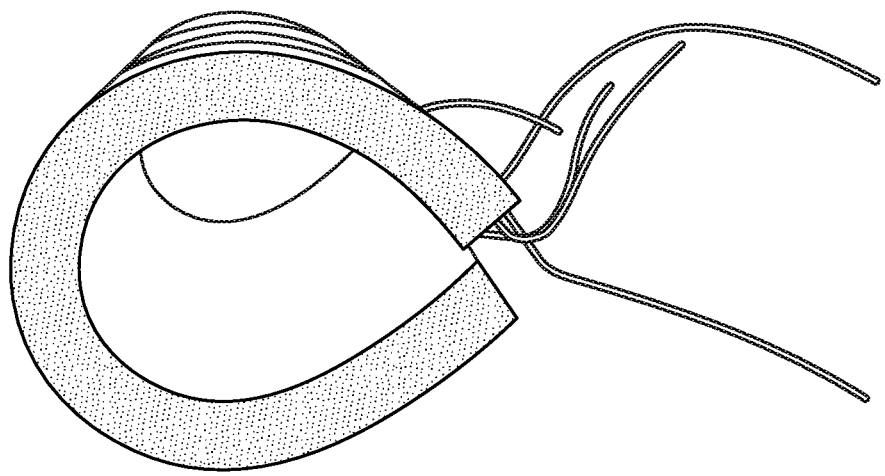
FIG. 8 depicts a flat foam-reinforced aerogel sheet which is folded into a pre-form shape, and secured with a band.
Figure 9:
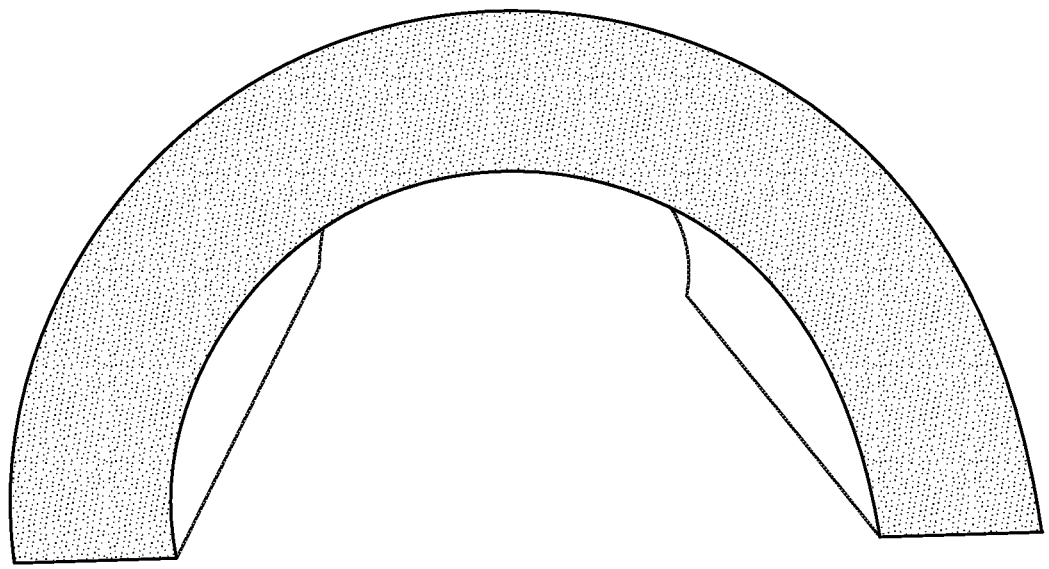
FIG. 9 depicts a foam-reinforced aerogel sheet which was shaped from a flat sheet into a curved pre-form shape using heat treatment.

The steps of Example 1 were repeated using a sheet of reticulated polyurethane foam as the reinforcing material, 12 mm in thickness. The foam-reinforced aerogel sheet was folded into a preformed shape and secured with a band, as shown in FIG. 8. The folded sheet was placed in an oven and heated treated at a temperature of 150° C. for up to 3 hours. The material was removed from the oven and allowed to cool. The securing band was removed, and the heat-treated sheet was allowed to partially unfold. The resulting heat-treated sheet permanently retained a semi-circular shape, as shown in FIG. 9.

Example 9

The steps of Example 1 were repeated using a sheet of reticulated polyurethane foam as the reinforcing material, 12 mm in thickness. The foam-reinforced aerogel sheet was folded into a preformed shape and secured with a band, as shown in FIG. 8. The folded sheet was placed in an oven and heated treated at a temperature of 150° C. for up to 3 hours. The material was removed from the oven and allowed to cool. The securing band was removed, and the heat-treated sheet was allowed to partially unfold. The resulting heat-treated sheet permanently retained a semi-circular shape, as shown in FIG. 9.

Example 10

Figure 10:
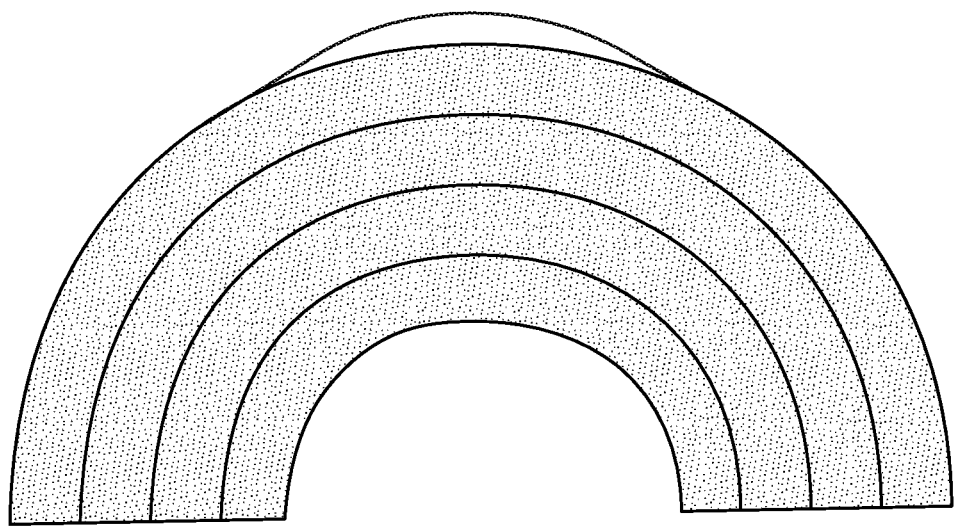
FIG. 10 depicts a multilayer laminate comprising multiple layers of foam-reinforced aerogel sheets which were shaped from a flat sheet into a curved pre-form shape using heat treatment, and then laminated together using an adhesive.
Figure 11:
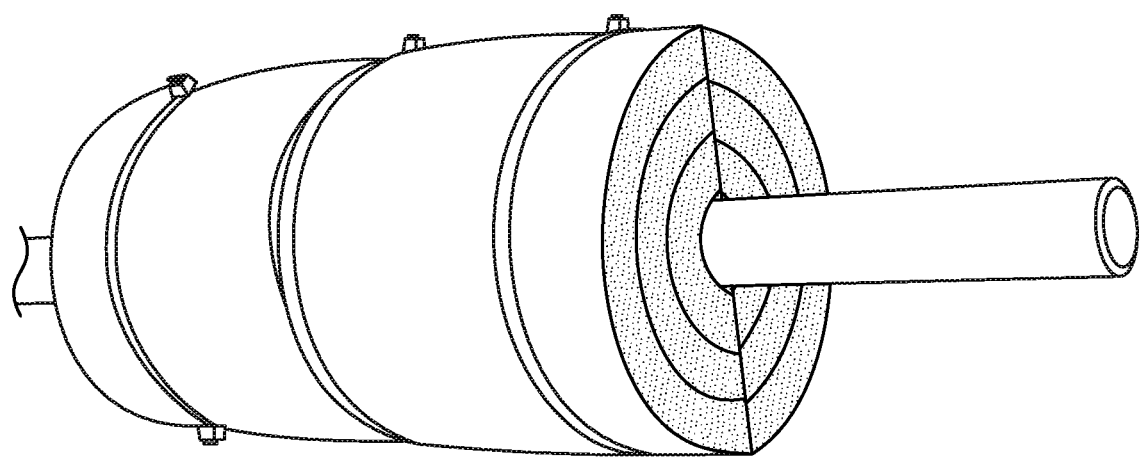
FIG. 11 depicts a pipe insulation section comprising multiple layers of foam-reinforced aerogel sheets which were shaped from a flat sheet into a curved pre-form shape using heat treatment, then laminated together using an adhesive, and finally secured around a pipe section.

Multiple heat-shaped aerogel composite sheets from Example 9 were provided. The heat-shaped sheets were laminated into a multilayer half-shell insulation laminate using an adhesive to bond layers together, as shown in FIG. 10. Two of these half-shell, pre-form insulation laminates were combined around a pipe section and secured with a band, thus forming an insulation sleeve fully encasing the outer circumference of the pipe section, as shown in FIG. 11.

Example 11

A sheet of polyurethane (PU) open-cell foam is provided. Two sheets of flexible facing material are provided, each comprising about 18% spandex and 82% nylon, with a density of 0.3 g/cc. A polyurethane composite adhesive is applied to portions of a first surface of the foam sheet. A sheet of the flexible facing material is applied to the adhesive-modified surface of the foam sheet. Pressure is applied to the laminate as the adhesive completes drying, thus forming a solid bond between the foam sheet and the flexible facing layer. The lamination process is then repeated for the second surface of the foam sheet, thus forming a sandwich laminate sheet comprising a base layer comprising a foam sheet with flexible facing layers attached to each surface of the base layer.

Example 12

A sandwich laminate sheet from Example 11 is provided. The sandwich laminate sheet is rolled into a preform roll; a spacer material is co-rolled with sandwich laminate sheet to provide spacing between the layers of the roll. The roll is placed in a cylindrical walled container. A silica precursor solution is formed by combining methyl triethoxysilane (MTES), tetraethoxy orthosilicate (TEOS), water, acid catalyst, and ethanol. A gelation catalyst solution is formed by combining ethanol with dilute $NH_3$ in $H_2O$. The catalyst solution is combined with the silica precursor solution to form a catalyzed silica precursor solution. The resulting solution is then poured into the container. The catalyzed silica precursor solution is allowed time to infiltrate through the facing layers into the foam base layer of the sandwich laminate sheet, and the materials are allowed to gel. After gelation, the resulting gel-foam composites are aged overnight in a sealed bath of ethanol at 50° C. The solvent in the gels is removed by supercritical $CO_2$ extraction to generate sheets of laminated, foam-reinforced aerogel composite.

Example 13

A sandwich laminate sheet from Example 11 is provided. A silica precursor solution is formed by combining methyl triethoxysilane (MTES), tetraethoxy orthosilicate (TEOS), water, acid catalyst, and ethanol. A gelation catalyst solution is formed by combining ethanol with dilute $NH_3$ in $H_2O$. The catalyst solution is combined with the silica precursor solution to form a catalyzed silica precursor solution. The sandwich laminate sheet is fed onto a moving conveyor, and the resulting catalyzed silica precursor solution is poured onto the top facing layer of the sandwich laminate sheet as it travels along the moving conveyor. The catalyzed silica precursor solution is allowed time to infiltrate through the top facing layer into the foam base layer of the sandwich laminate sheet, and the materials are allowed to gel. After gelation, the resulting sandwich laminate gel-foam composite sheet is rolled and placed into cylindrical walled container; a spacer material is co-rolled with composite sheet to provide spacing between the layers of the roll. The rolled composite sheet is aged overnight in a sealed bath of ethanol at 50° C. The solvent in the gels is removed by supercritical $CO_2$ extraction to generate sheets of laminated, foam-reinforced aerogel composite.

Example 14

For Example 14, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. A 0.61 m width roll of 90 pores/inch (ppi) (35.4 pores/cm) reticulated polyester polyurethane foam, with a nominal density of 2.2 $lb/ft^3$ (35.2 $kg/m^3$) and about 0.080 inch in thickness (2 mm) (RS090WHGR1, Crest Foam Industries Inc., division of INOAC, Moonachie, N.J.) was obtained.

A roll of expanded PTFE membrane (0.81 m) that had been subjected to temperatures above the crystalline melt temperature of PTFE and possessing the following properties was obtained: average thickness of 0.0137 mm, average density of 0.370 g/cc, average Frazier Number of 9.5, average Gurley Number of <1, average matrix tensile strength in the direction of the fibrils of 222 MPa, average matrix tensile strength in the direction orthogonal to the direction of the fibrils of 91 MPa, and pore size of 5.0 µm. This membrane was made generally in accordance with the teachings of U.S. Pat. No. 5,814,405.

A polyurethane adhesive similar to those cited in U.S. Pat. No. 4,532,316 was heated to a temperature sufficient to liquefy. The adhesive was applied to the membrane in a dot pattern with an adhesive laydown of about 40% by area via a gravure roll apparatus which had been heated to about 115° C.

The adhesive coated side of the membrane was adhered to one side of the reticulated polyurethane foam by passing it through a nip, and the resulting laminate was collected on a spool. Another length of the adhesive coated membrane was applied to the opposite side of the reticulated foam in a similar manner to create a laminated construct. The laminated construct was spooled and allowed to cure at room temperature for 48 hours.

A requisite amount of a sol comprising hydrolyzed tetraethoxysilane and its derivatives and condensation catalyst, aqueous ammonium hydroxide, were combined and allowed to infiltrate the laminated construct. After a syneresis period of 3-30 minutes the gel/foam composite was subjected to further chemical aging, in which the wet gel composite was exposed to a hot ethanol solution of ammonium hydroxide and a hydrophobic agent containing various amounts of alkyl and silyl groups (hexamethyldisilazane). After aging, the foam/aerogel composite was transferred to a cylindrical pressure vessel and was then dried using supercritical $CO_2$ extraction to remove the solvent. The composite was then treated with heat to remove any residual moisture content and/or volatiles.

Three samples measuring approximately 20 cm by 20 cm were cut from the laminate construct impregnated with aerogel. These samples were determined to have the following properties: average thickness of 1.61 mm; average density of 0.179 g/cc; average thermal conductivity 13.9 mW/mK. These samples demonstrated a high dust retention.

Example 15

For Example 15, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. Two different membranes of expanded polyethylene (ePE) were used as scaffolds. Both scaffolds were commercially available as Arioso™ composite membranes (Lydall) and were 8.5×11 inches. Both materials had an average Gurley number of less than 1 sec, and a pore size of 8.8 µm. These Arioso scaffolds contained ePE on one side of porous layer.

A requisite amount of a sol comprising hydrolyzed tetraethoxysilane and its derivatives and a condensation catalyst, aqueous ammonium hydroxide, were combined and allowed to infiltrate each membrane.

The membranes were determined to have the following properties before and after addition of the aerogel in Table 1. When testing thermal conductivity both samples were stacked and an average thermal conductivity was obtained as shown in Table 1. These materials demonstrated a high dust retention.

TABLE 2

| Sample | Thickness | | Density | | Average Thermal |
|--------|-----------|---------|---------|-------|----------------------------|
|        | Initial   | Final   | Initial | Final | Conductivity at 37.5° C.   |
| 1a     | 0.70      | 0.85    | 0.142   | 0.194 | 13.6 mW/m-K                |
| 1b     | 0.47      | 0.50    | 0.132   | 0.171 |                            |

Example 16

For Example 16, density was gravimetrically determined using a standard analytical balance in conjunction with a volume determination in accordance with the general teachings described in ASTM C303 and thermal conductivity was determined at a mean temperature of 37.8° C. at a compressive load of 2 PSI in accordance with the general teachings described in ASTM C518.

A continuous matrix of aerogel within a microporous scaffold was created in the following manner. A nonwoven fabric comprising oxidized polyacrylonitrile (OPAN) fiber with an areal density, 0.01-0.03 g/cm$^2$ was obtained.

A roll of expanded PTFE membrane (0.81 m) that had been subjected to temperatures above the crystalline melt temperature of PTFE and possessing the following properties was obtained: average thickness of 0.032 mm, average density of 0.587 g/cc, pore size of 0.47 μm, average Gurley number of 8.9 sec, average matrix tensile strength in the direction of the fibrils of 88 MPa, and average matrix tensile strength in the direction orthogonal to the direction of the fibrils of 35 MPa. This membrane was made generally in accordance with the teachings of U.S. Pat. No. 3,953,566.

A polyurethane adhesive similar to those cited in U.S. Pat. No. 4,532,316 was heated to a temperature sufficient to liquefy. The adhesive was applied to the membrane in a dot pattern with an adhesive laydown of about 40% by area via a gravure roll apparatus which had been heated to about 115° C.

The adhesive coated side of the membrane was adhered to one side of the reticulated polyurethane foam by passing it through a nip, and the resulting laminate was collected on a spool. Another length of the adhesive coated membrane was applied to the opposite side of the reticulated foam in a similar manner to create a laminated construct. The laminated construct was spooled and allowed to cure at room temperature for 48 hours.

A requisite amount of a sol comprising hydrolyzed tetraethoxysilane and its derivatives and a condensation catalyst, aqueous ammonium hydroxide, were combined and allowed to infiltrate the laminated construct. After a syneresis period of 3-30 minutes the gel/foam composite was subjected to further chemical aging, in which the wet gel composite was exposed to a hot ethanol solution of ammonium hydroxide and a hydrophobic agent containing various amounts of alkyl and silyl groups (hexamethyldisilazane). After aging, the foam/aerogel composite was transferred to a cylindrical pressure vessel and was then dried using supercritical $CO^2$ extraction to remove the solvent. The composite was then treated with heat to remove any residual moisture content and/or volatiles.

Ten samples measuring approximately 10 cm by 10 cm were cut from the laminate construct impregnated with aerogel. These samples were determined to have the following properties: average thickness of 2.29 mm; average density of 0.0243 g/cc; average thermal conductivity 17.4 mW/mK. These samples demonstrated a high dust retention.

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the invention and does not pose a limitation on the scope of the invention unless otherwise claimed.

What is claimed is:

1. An aerogel composite comprising:
    at least one base layer having a top surface and a bottom surface, the base layer comprising a reinforced aerogel composition which comprises a reinforcement material and a monolithic aerogel framework;
    a first facing layer comprising a first facing material permanently attached to the top surface of the base layer via a first adhesive; and
    a second facing layer comprising a second facing material permanently attached to the bottom surface of the base layer via a second adhesive;
    wherein at least a portion of the monolithic aerogel framework of the base layer extends into at least a portion of both the first facing layer and the second facing layer;
    wherein the first facing material and the second facing material each consist essentially of fluoropolymer material; and
    wherein the reinforcement material and the fluoropolymer material are different.

2. The aerogel composite of claim 1, wherein the reinforcement material comprises a foam reinforcement material.

3. The aerogel composite of claim 1, wherein each of the first adhesive and the second adhesive is selected from the group consisting of: an aerosol adhesive, a urethane-based adhesive, an acrylate adhesive, a hot melt adhesive, an epoxy, a rubber resin adhesive; a polyurethane composite adhesive, and any combinations thereof.

4. The aerogel composite of claim 1, wherein the first facing layer and second facing layer each comprise a fluid-permeable facing material.

5. The aerogel composite of claim 1, wherein the composite material has a thermal conductivity between 18.0 mW/m-K and 40.0 mW/m-K.

6. The aerogel composite of claim 1, wherein the first adhesive and the second adhesive are the same.

7. The aerogel composite of claim 1, wherein the first adhesive and the second adhesive are different.

* * * * *